C. H. GASKINS.
FISHING REEL.
APPLICATION FILED FEB. 5, 1908.
901,609.
Patented Oct. 20, 1908.
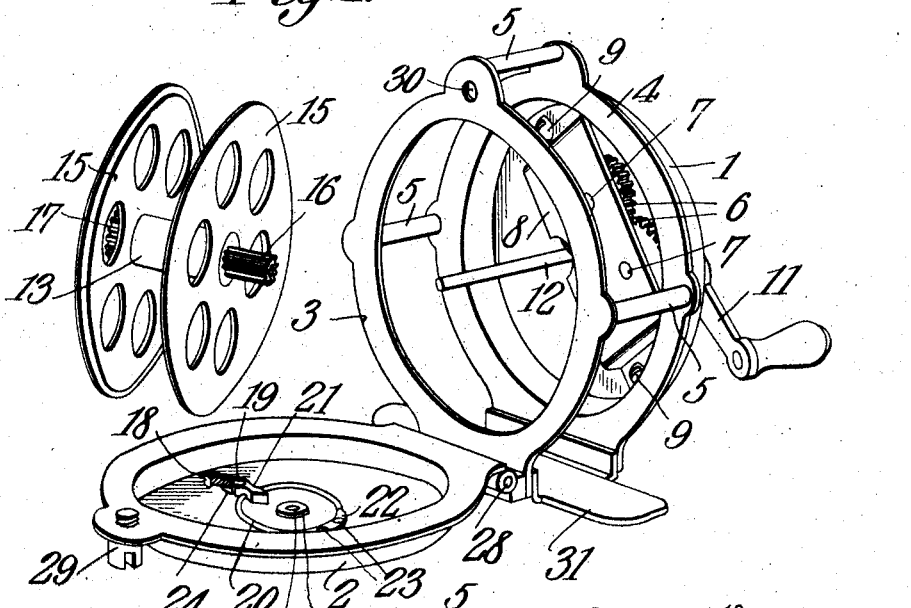
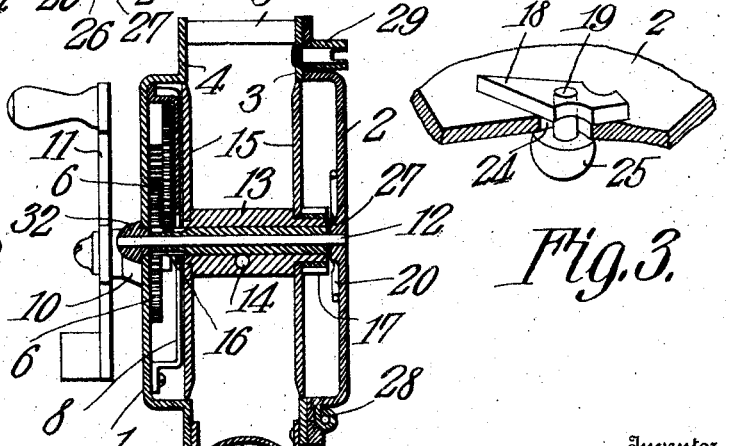
Inventor
Claude H. Gaskins.
By C. A. Snow & Co.
Attorneys.
Witnesses:

UNITED STATES PATENT OFFICE.

CLAUDE H. GASKINS, OF SHAMOKIN, PENNSYLVANIA, ASSIGNOR OF ONE-FOURTH TO FELIX G. SEILER AND ONE-FOURTH TO DANIEL G. SEILER, BOTH OF SHAMOKIN, PENNSYLVANIA.

FISHING-REEL.

No. 901,609.   Specification of Letters Patent.   Patented Oct. 20, 1908.

Application filed February 5, 1908. Serial No. 414,415.

*To all whom it may concern:*

Be it known that I, CLAUDE H. GASKINS, a citizen of the United States, residing at Shamokin, in the county of Northumberland and State of Pennsylvania, have invented a new and useful Fishing-Reel, of which the following is a specification.

This invention relates to fishing reels.

The object of the invention is to improve the manner of assembling the multiplying gears and the spool with the casing, whereby to permit removal of the latter and the inspection and cleansing of the former without danger of losing any of the parts of the operating mechanism; to compensate for any end shake of the spool, thus to insure easy running and prevent cutting of the line; and generally to improve the construction of such articles and measurably to increase their durability and effectiveness.

With the above and other objects in view, as will appear as the nature of the invention is better understood, the same consists in the novel construction and combination of parts of a fishing reel, as will be hereinafter fully described and claimed.

In the accompanying drawing forming a part of this specification, and in which like characters of reference indicate corresponding parts, Figure 1 is a view in perspective of the reel, the spool being detached therefrom in order to show the mechanism within the casing. Fig. 2 is a vertical longitudinal sectional view through the reel. Fig. 3 is a fragmentary detail view in perspective, displaying certain parts not clearly seen in Fig. 1.

The casing comprises two shells 1 and 2, and an annulus 3 that is connected to the rim 4 of the shell 1 by the usual posts 5. Within the shell 1 is mounted a train of multiplying gears, designated generally 6, which may be of the usual or any preferred construction, the shafts or bearings 7 of which are supported partly by the shell 1 and partly by the bridge plate 8 that is detachably secured to the shell by screws 9. This bridge plate operates not only to prevent the gears from dropping out of the shell when the spool, presently to be described, is removed, but also protects them in a large measure from injury and wear, as by the presence of sand or grit, as it will operate practically to prevent foreign matter from lodging in the teeth of the gears. The shaft of one of the gears, as usual, extends through a boss 10 on the outer side of the shell 1, and has connected with it, in any preferred manner, an ordinary counterbalanced crank 11.

Projecting from the center of the inner wall of the shell 1 is a pin or shaft 12 upon which is mounted a spool, that consists of a core 13 provided with a line receiving opening 14, and a pair of heads or flanges 15 which, for purposes of lightness, are orificed, although this is not essential. The inner edges of the peripheries of the heads are rounded to lie within the planes of the opposed faces of the rim 4 and the annulus 3, thus to prevent cutting of the fishing line. From each of the heads projects a rigid gear 16 and 17, respectively, the former of which meshes with one of the gears 6 of the multiplying train, and the latter of which is engaged by a click or brake 18 secured to a pin 19. To hold the click either in or out of engagement with the gear 17, a circular spring 20 is employed, the ends of which engage seats 21 disposed adjacent to the inner end of the click and on opposite sides thereof, the intermediate portion of the spring being flattened at 22 to receive rivets 23 that secure it to the shell 2. The pin 19 projects through a slot 24 in the shell 2 and carries on its outer end a button 25 by which the click may be shifted as required.

The shaft 12 projects through an orifice 26 in the shell 2 and lies flush with the outer side thereof, and in order to prevent any end shake of the spool, the shell 2 is provided on its inner face with a teat 27 through which extends the orifice 26, and which is adapted to engage with the outer face of the gear 17 to secure the object sought, but without in the least interfering with the easy operation of the multiplying gears.

The shell 2 is assembled with the annulus 3 by a hinge 28 of any preferred type, and in order to hold the shell in locked relation to the annulus, a screw 29 is provided which is swiveled into the rim of the shell to prevent loss and is adapted to engage a threaded orifice 30 in the annulus. The nick of this screw is made sufficiently wide and deep to receive the back of a pen-knife blade, or a coin, such as a dime, so that in the event of the user of the reel not being provided with a screwdriver, he will still be enabled to turn the screw. The screw 29 serves another and very important function in addition to the one above described, viz., that of an adjuster for regulating the force of contact between the teat 27 and the gear 17, whereby to take up end shake without causing any binding action between the teat and the gear, which would operate to interfere with the easy running of the spool.

The reel is provided with the usual curved plate 31 by which it is secured in any suitable manner to a fishing pole.

From the foregoing description it will be seen that by the employment of the bridge plate 8, all danger of the multiplying gears becoming disconnected and dropping from the casing will be obviated, and, further, by making the gears 16 and 17 rigid with the spool, their loss will also be prevented when the spool is removed from the casing. A further feature of advantage is in the provision of the teat 27 for preventing end shake of the spool, thereby to insure even running and obviate uneven wear of the multiplying gears.

As the shaft 12 is, of necessity, quite small in cross diameter, it is essential that it should be properly stayed at both ends to impart to it the greatest rigidity, and this is secured by having one end seated in the orifice 26 and its other end secured in a boss or lug 32 mounted on the outer side of the shell 1.

I claim:—

1. In a fishing reel, the combination with a spool having a click gear rigid therewith, of a hinged shell having a boss to engage the gear to hold the spool from end shake, and means for controlling the force of contact between the boss and the gear.

2. A fishing reel comprising a stationary shell, a train of multiplying gears arranged therein, an annulus spaced from and rigidly secured to the shell, a spool having at one end a rigid gear to engage with one of the train of gears, and at its other end a rigid click gear, a second shell hinged to the annulus and carrying a click, and provided with a teat to engage with the click gear to prevent end shake of the spool, and a screw swiveled in the second shell and having a threaded engagement with the annulus.

3. A fishing reel comprising a stationary shell, a train of multiplying gears arranged therein, a bridge plate secured to the shell to shield the gears and to hold them against accidental separation therefrom, an annulus spaced from and rigidly secured to the shell, a spool having at one end a rigid gear to engage with one of the train of gears and at its other end a rigid click gear, a second shell hinged to the annulus and carrying a click and provided with a teat to engage with the click gear to prevent end shake of the spool, and a screw swiveled in the second shell and having a threaded engagement with the annulus.

4. In a fishing reel, the combination with a two-part shell, one of which incloses a spool and mechanism for driving the same, of means permanently assembled with one of the shells for securing it to the other shell and for taking up end shake between the spool and one of the shell members.

5. In a fishing reel, the combination with a spool having a click gear combined therewith, of a hinged shell having a boss to engage the gear to hold the spool from end shake, and means for holding the shell in adjusted position relatively to the gear.

6. A fishing reel comprising a stationary shell, a train of multiplying gears arranged therein, a spool arranged within the shell and being operatively connected with the gears, a second shell hinged relatively to the first shell, and a screw having a swiveled connection with the second shell for holding the latter in locked position relatively to the stationary shell.

In testimony that I claim the foregoing as my own, I have hereto affixed my signature in the presence of two witnesses.

CLAUDE H. GASKINS.

Witnesses:
  C. E. DOYLE,
  JAS. M. HARKER.